United States Patent [19]
Fujimoto

[11] Patent Number: 5,768,143
[45] Date of Patent: Jun. 16, 1998

[54] ID CARD ISSUING SYSTEM AND METHOD

[75] Inventor: Toshiro Fujimoto, Yamanashi-ken, Japan

[73] Assignee: Nisca Corporation, Yamanashi-Ken, Japan

[21] Appl. No.: 578,085

[22] Filed: Dec. 27, 1995

[30] Foreign Application Priority Data

Dec. 28, 1994 [JP] Japan .................................. 6-339037

[51] Int. Cl.[6] .................................................. G06F 11/00
[52] U.S. Cl. .................. 364/479.05; 364/479.07; 364/479.14; 364/552; 902/4; 902/27; 902/18; 235/375; 235/380
[58] Field of Search .................. 364/479.05, 479.03, 364/479.07, 479.14, 468.09, 468.15–468.17, 468.23, 478.03, 478.09, 478.1, 478.12–478.15, 550, 551.01, 552, 514 R; 235/375, 380, 381, 379; 902/4, 18, 26, 27; 340/825.3, 825.31, 825.33, 825.34; 395/218, 241, 244, 106, 101, 113, 117; 283/107–112, 74, 75, 77; 400/521, 525, 708, 120.01–120.03; 101/425, DIG. 29, DIG. 30; 705/22–24, 27, 28, 44

[56] References Cited

U.S. PATENT DOCUMENTS

| | | | |
|---|---|---|---|
| 5,229,586 | 7/1993 | Ishii | 235/375 |
| 5,326,179 | 7/1994 | Fukai et al. | 400/521 |
| 5,358,582 | 10/1994 | Koshizuka et al. | 283/77 |
| 5,410,642 | 4/1995 | Hakamatsuka et al. | 395/113 |
| 5,423,619 | 6/1995 | Kohno | 400/525 |
| 5,592,400 | 1/1997 | Sasou et al. | 364/514 R |

FOREIGN PATENT DOCUMENTS

5-108894  4/1993  Japan .

*Primary Examiner*—Emanuel Todd Voeltz
*Assistant Examiner*—Hal P. Wachsman
*Attorney, Agent, or Firm*—Kane,Dalsimer,Sullivan, Kurucz, Levy, Eisele and Richard, LLP

[57] ABSTRACT

A system for issuing ID cards to which personal information data such as a personal identification number are written and verifying whether or not the information data are successfully written to the ID card. When the information data are confirmed to be unsuccessfully written to the ID card as the result of verification, the card is regarded as a faulty card, and an erase signal is automatically overwritten to the faulty card before discharging the card out of the system, so as to ensure absolute secrecy of the personal information.

16 Claims, 8 Drawing Sheets

ID CARD ISSUING SYSTEM AND METHOD

BACKGROUND OF THE INVENTION

1. Field of the Invention:

This invention relates to an ID card issuing system having a function of rejecting faulty cards brought about in forming ID cards of various kinds and a method for accomplishing the system, and more particularly to a system and method for automatically erasing private information data written to the ID card which causes an error in writing the information data to the card so as to ensure secrecy of a cardholder.

2. Description of the Prior Art:

A device for issuing ID cards (identification cards) such as a credit card and cash card, to which personal information data including identification numbers of the cardholders are written, generally comprises printing means for printing letters, marks and patterns indicating the name and/or identification number of the cardholder on a card base, and an encoder for magnetically or optically writing security codes such as the personal identification number (PIN) of the cardholder to the card base. The ID card issuing device is especially desired to preserve the secrecy with regard to the personal information data of the cardholder and prevent the only ID card to be issued to the true cardholder from passing into another's possession or being reproduced unjustly.

Figure 1:
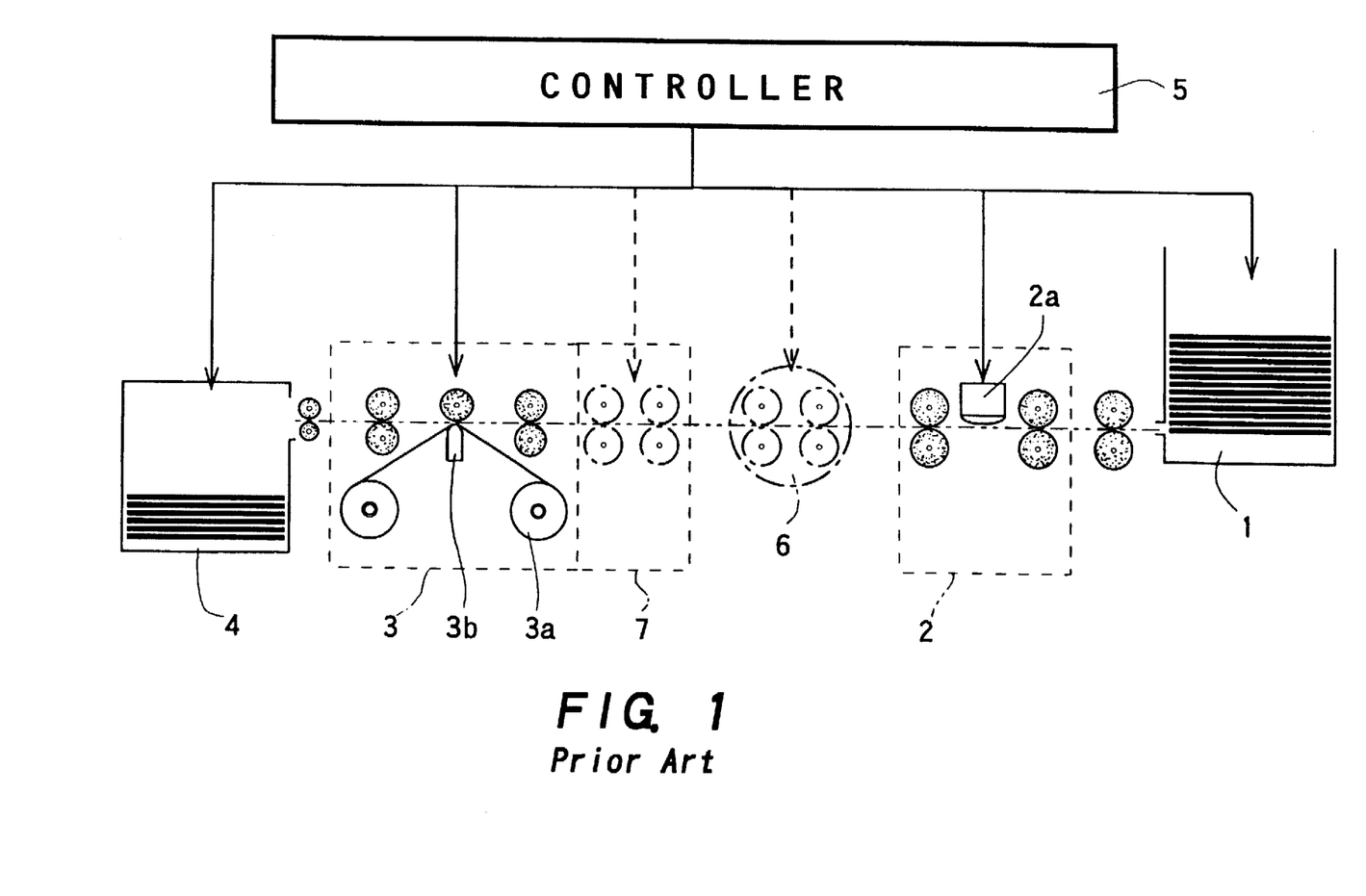
FIG. 1 is a schematic diagram of a conventional ID card issuing system.

Japanese Patent Application Public Disclosure No. HEI 5-108894(A) shows one example of ID card issuing devices. As schematically shown in FIG. 1, common ID card issuing system including the cited device each comprise, by and large, a card feeder 1 for supplying a card (blank card base) C having a magnetic strip, a magnetic encoder 2 having a magnetic head for magnetically writing personal information data such as a personal identification code to the magnetic strip of the card C, a printing unit 3 for printing letters, marks and/or patterns on the card, a card stacker 4 for storing the finished card, and a controller 5. The printing unit 3 in the illustrated system has a thermal transfer printing unit including a thermal transfer ink ribbon 3a and a thermal head 3b.

The system may further include a card turning unit 6 for reversing the card over to print images on both sides of the card with the printing unit capable of printing on only one side of the card, and a card cleaner 7. The card turning unit 6 and cleaner 7 are not indispensable to the ID card issuing system.

In the conventional ID card issuing system, information data such as a personal identification number are magnetically written to the magnetic strip of the blank card C fed from the card feeder 1 by use of the magnetic encoder 2. The card C to which the information data are written is transferred to the printing unit 3 so as to be printed with arbitrary letters and/or patterns and then sent out to the card stacker 4.

Nevertheless, even when the card is unsuccessfully made or gives rise to an error in consequence of one cause or another, such a faulty card is discharged to the card stacker 4 without erasing the personal information data from the card. Although the faulty card thus discharged must be torn so as to prevent someone from deciphering the personal information data from the card, the conventional card issuing device entails the risk of allowing a misguided person to abuse the private information of the true cardholder or unjustly produce the card.

Even in the case that the card issuing operation of the system is brought to a halt, leaving the card in the system because of the failure of supplying electric power to the system or any other causes, there is a possibility of allowing another person to get the left card to which the personal information data of the true cardholder may be possibly written, when resuming the operation of the system.

There has so far been no ID card issuing system capable of preventing the faulty card on which the personal data are recorded from being discharged as it is in order to ensure the secrecy of personal information data written to the card.

OBJECT OF THE INVENTION

An object of the present invention is to provide a reliable system and method capable of effectively issuing an ID card and serving a function of ensuring absolute secrecy with regard to the personal information data of a cardholder even when giving rise to an error in preparing the card.

Another object of the present invention is to provide an ID card issuing system and method capable of verifying information data written magnetically, electrically or optically to the card, and automatically erasing the information data when finding an error in writing the information data to the card so as to ensure the secrecy of the personal information data of the cardholder.

Still another object of the present invention is to provide an ID card issuing system and method capable of continuously issuing ID cards with personal information data and automatically overwriting an erase signal on a faulty card which gives rise to an error in preparing the ID card in order to erase the personal data possibly written to the ID card so as to ensure absolute secrecy of the personal data.

SUMMARY OF THE INVENTION

To attain the object described above according to the present invention, there is provided an ID card issuing system comprising a printing unit for performing printing on at least one side of a card, a recording unit for writing specific information data to the card and reading the written data from the card, and a controller including a verify circuit for verifying the data read from the card.

When an error is found as the result of verification of the data written to the card, the controller lets the recording unit overwrite an erase signal to the card. The card which gives rise to the error is regarded as a faulty card and rejected.

The information data may be written magnetically, electrically or optically to the card. When an error occurs, the information data written to the card can be erased by overwriting a meaningless binary signal, direct current signal or alternate current signal as the erase signal to the faulty card.

Also when the electric power supplied to the system is disconnected accidentally or intentionally with a card left in the system during the card issuing operation, the card to which the information data may possibly be written is subjected to data erasing treatment by overwriting the erase signal to the card so as to observe absolute secrecy.

A card discharge unit has a faulty card stacker to which the faulty card is sent out, and a proper card stacker to which a proper card is sent out.

Thus, the faulty card sent to the faulty card stacker no longer possesses any private information data, and therefore, may be disposed of as it is.

Other and further objects of this invention will become obvious upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENTS

Figure 2:
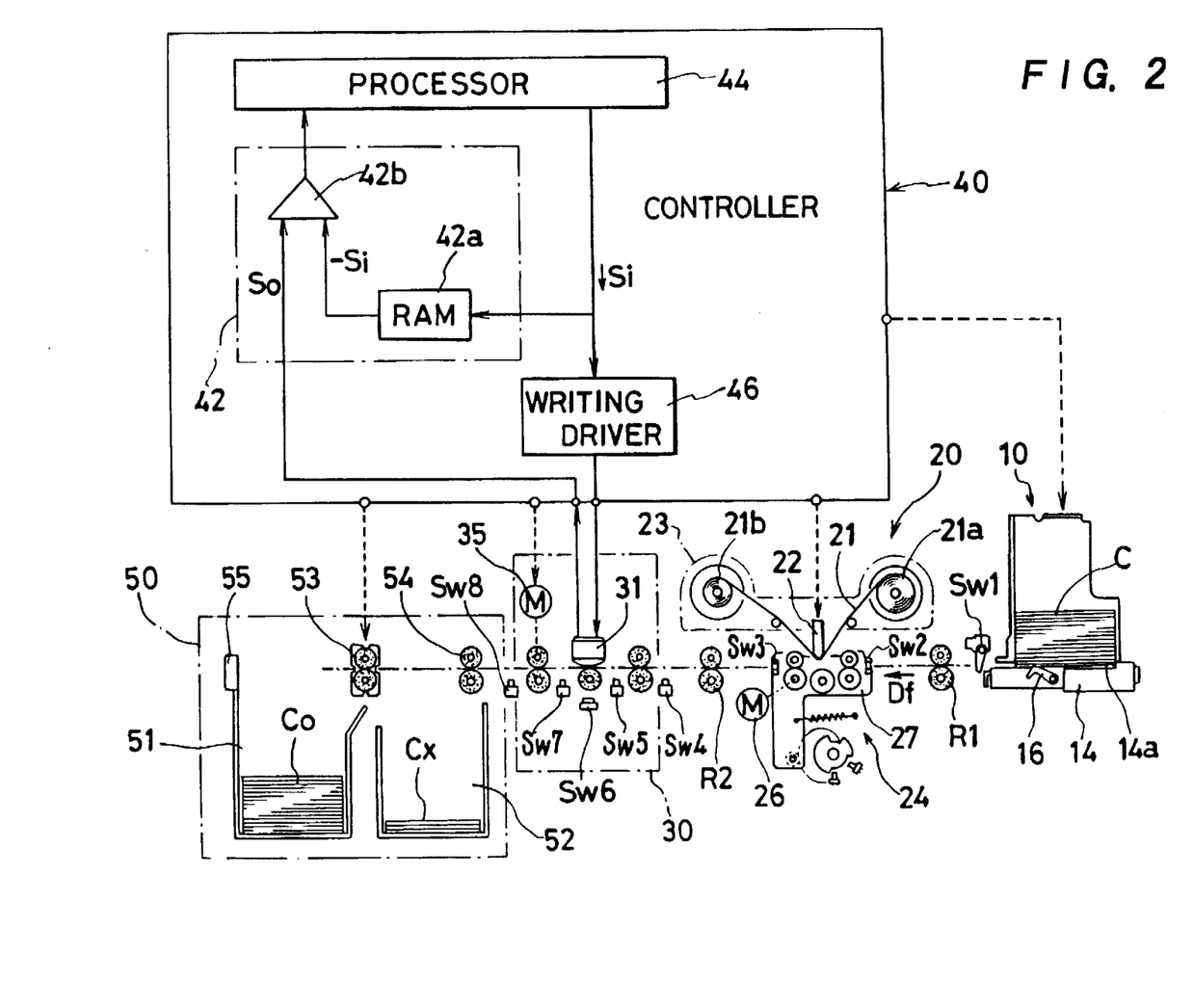
FIG. 2 is a schematic diagram of one embodiment of an ID card issuing system according to this invention.
Figure 3:
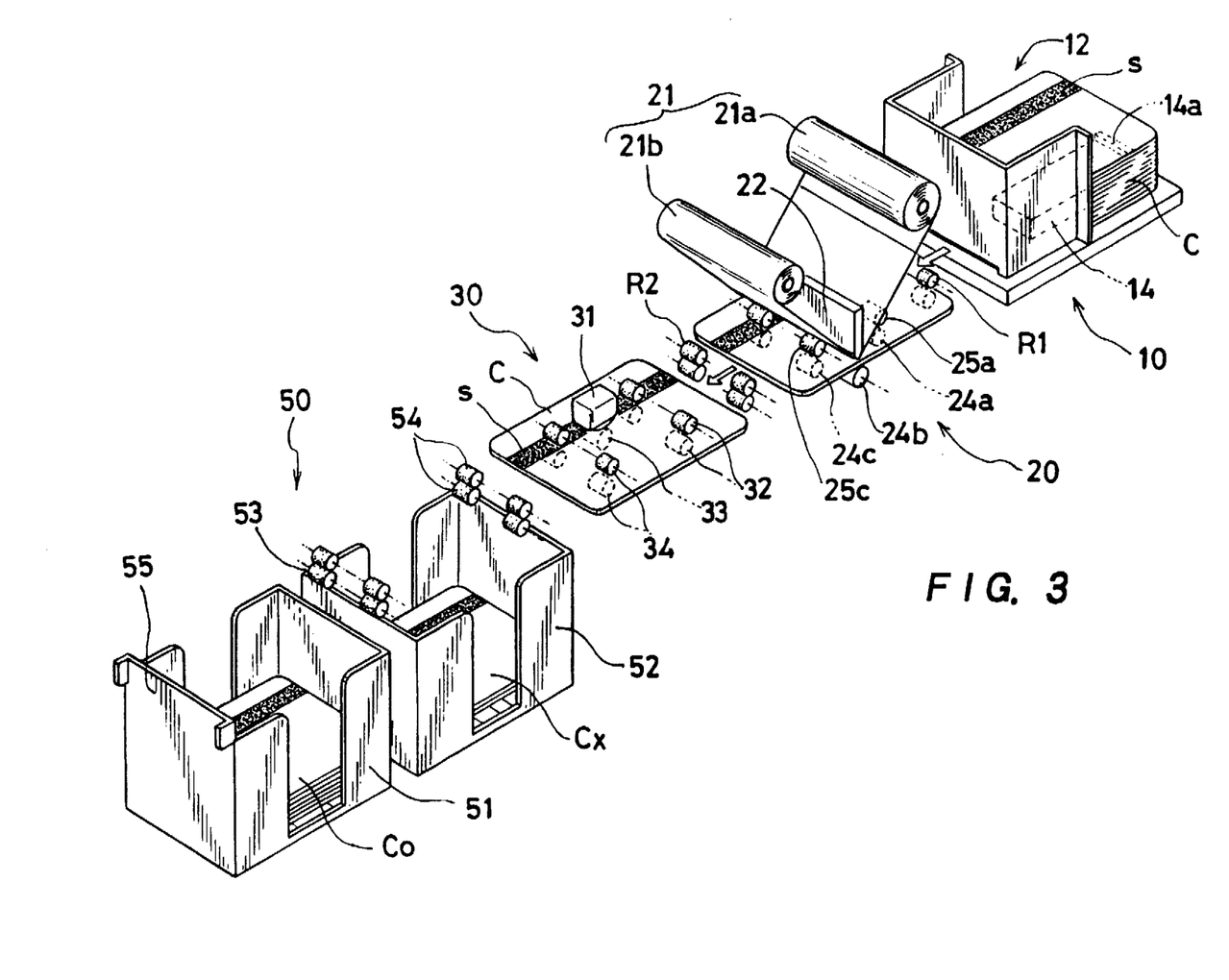
FIG. 3 is a perspective view schematically showing the system of FIG. 1.

The ID card issuing system according to this invention has a function of finding and rejecting a faulty card which gives rise to an error from one cause or another, upon erasing information data possibly written to the card with a meaningless erase signal, thereby to ensure absolute secrecy of private information such as a personal identification number of a cardholder. One embodiment of the system of this invention is illustrated in FIG. 2 and FIG. 3.

Although the ID card C applied to the illustrated embodiment has a magnetic strip s as a recording medium in order to magnetically record the personal information data thereon, the information data to be written to the ID card may be recorded not only magnetically on one part or full area of a magnetic surface, but also electrically on an ID card or the like, optically on a holographic memory, or physically.

The ID card issuing system of the first embodiment of this invention comprises a card feeder 10 for feeding blank cards C one by one, a printing unit 20 for printing desired images on one side of the card C fed from the card feeder 10, a recording unit 30 including a magnetic encoder for magnetically writing desired information data to the card C fed from the printing unit 20, a controller 40 including a verify circuit 42 for verifying the data written to the card C, and a card discharge unit 50 for the finished cards sent out from the recording unit 30.

The card feeder 10 disposed at the card entry portion of the system is generally loaded with one or more blank cards C and serves to feed the blank cards C one by one to the printing unit 20 along a card passageway W.

The card feeder 10 comprises a card holder 12 for holding the blank cards C, and a slider 14 having a hook 14a for catching the rear end of the lowermost of the blank cards stacked in the holder 12. The slider 14 horizontally movable for thrusting out only the lowermost card hooked by the hook 14a toward the printing unit 20. The card existing in the card feeder 10 is detected by a card empty sensor 16. If no card exists, the system assumes its inoperative state.

A card sensor Sw1 disposed near the exit of the card feeder 10 serves to observe the card sent out from the card feeder 10.

The card C fed from the card feeder 10 is transferred to the printing unit 20 by means of rollers R1.

The printing unit 20 serves to print arbitrarily desired letters, characters, marks, patterns and various images such as a photograph on one surface of the card fed from the card feeder 10. The printing unit 20 in this embodiment is of a thermal-transfer printer type which utilizes at least one color of thermal transfer ink applied to an Ink ribbon 21. As the thermal transfer ink there are thermally fusible wax-transfer ink, dye-sublimation ink and so forth.

The ink ribbon 21 is supplied from a supply roll 21a to a take-up roll 21b and pressed against the surface of the card C with a thermal head 22. By thermally operating the thermal head 22, the desired image is formed on the surface of the card.

The supply roll 21a and take-up roll 21b are together contained in a cartridge 23 so as to be easily set into a printing portion of the printing unit 20.

In a case that the desired image is composed of multiple colors, there are used thermal transfer color inks of at least three primary colors, e.g. yellow, magenta and cyan. With these colors, any color can be created by a subtractive color mixture method, but the number and kind of such colors are not specifically limited in this invention. For instance, black ink may be added for printing two gradation images such as letters, marks and bar-code patterns.

Thus, when the inks of three colors are used, the card is needed to pass the printing point defined at the heating end of the thermal head 22 three times. That is to say, the card C is forwarded in the feeding direction Df while coming into contact with the thermal head 22 to thermally transfer one color of ink on the ink ribbon 21 to the card C by selectively heating the dot elements of the thermal head 22. Then, the card C is sent back to the initial printing position in the printing unit 20 without touching the thermal head 22. The same procedure is repeated three times for completing three-colored printing.

In carrying out the colored printing, the card C is repeatedly brought into and out of contact with the thermal head by oscillating means 24. The means 24 has an entry side capstan roller 24a, platen roller 24b and exit side capstan roller 24c. Touch rollers 25a and 25c come in frictional contact with the capstan rollers 24a and 24c so as to guide the card C moving along the card passageway W between themselves and the rollers 24a and 24c.

Either one of the rollers 24a to 24c may be driven by a rotational drive means 26 including a stepping motor, and the other rollers may follow the roller driven by the drive means 26. In the illustrated embodiment, the roller 24c is driven by the drive means 26.

The rollers 24a to 24c, 25a and 25c are supported by a substantially L-shaped supporting member 27. In a normal state, the supporting member 27 is urged upward by a spring 27a so as to bring the platen roller 24b into contact with the thermal head 22. The support member 27 is provided at its lower portion with a cam follower 27b coming into contact with an elliptic cam 28a having an angle detecting plate 28b.

Figure 4A:
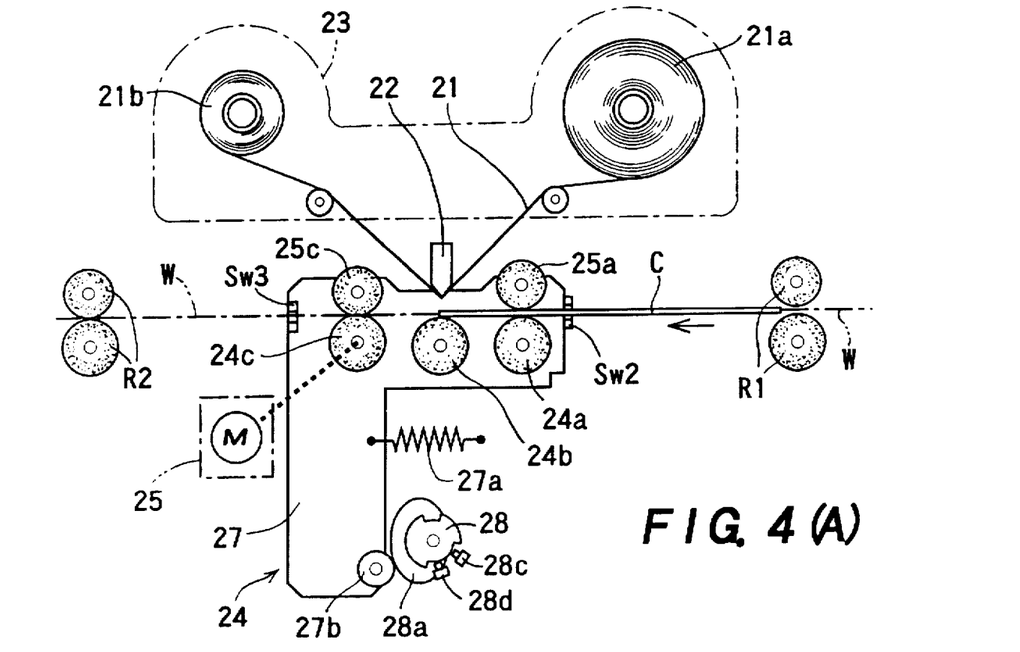
FIGS. 4(A) and 4(B) are front views showing the operating principle of a printing unit in the system of this invention.
Figure 4B:
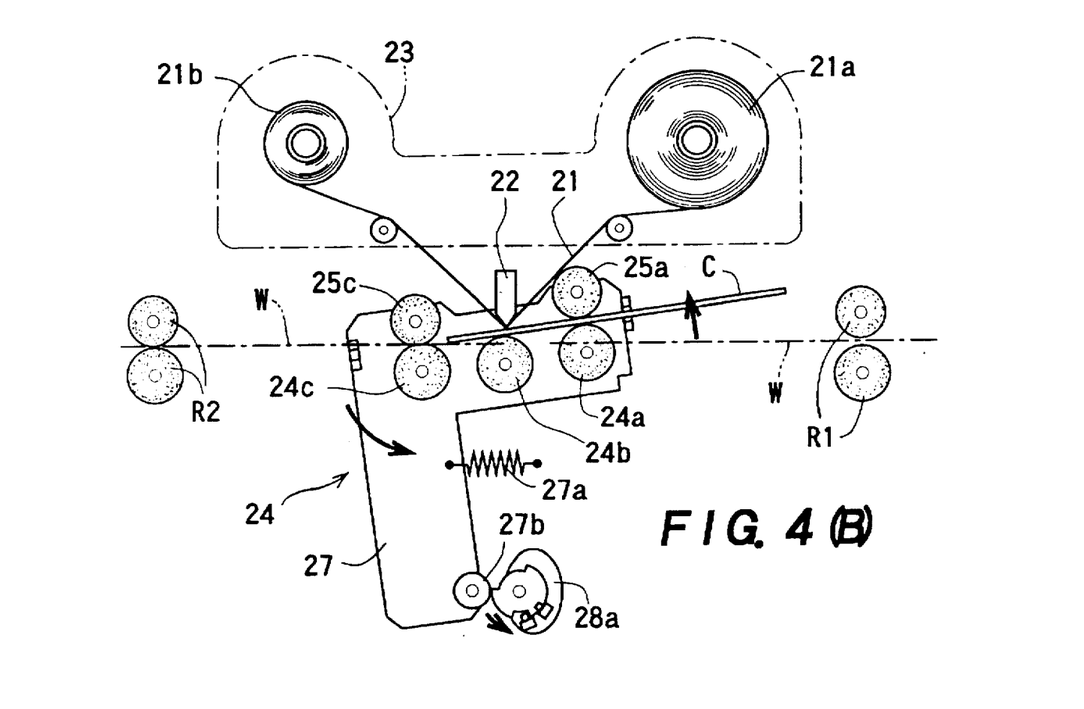

The card C is sent into between the rollers 24a and 25a as shown in FIG. 4(A), and then, the elliptic cam 28a rotates to sway the supporting member 27 around the roller 24c against the resistance of the spring 27a as shown in FIG. 4(B). As a result, the card C being out of contact with the thermal head 22 as shown in FIG. 4(A) is brought into contact with the thermal head 22 as shown in FIG. 4(B), so that the thermal transfer ink on the ink ribbon 21 can be thermally transferred to the surface of the card C by selectively actuating the thermal head 22, thereby forming the desired images on the card.

The movement of the card C is controlled by the controller 40 while detecting the position of the card by means of card sensors Sw2 and Sw3 disposed before and behind the rollers 24a to 24c.

The card C thus printed is delivered to the recording unit 30 by means of rollers R2.

In the recording unit 30, secret personal information data of the cardholder such as identification number are written to the card C fed from the printing unit 20.

The recording unit 30 includes a magnetic head 31 for magnetically writing the information data on the magnetic strip s of the card C, entry side rollers 32, a platen roller 33, exit side rollers 34, and driving means 35 for driving at least one of rollers 32 and 34.

There are disposed card sensors Sw4 and Sw5 before and behind the rollers 32, a card sensor Sw6 opposite to the magnetic head 31, and card sensors Sw7 and Sw8 before and behind the rollers 34. By these card sensors Sw4 to Sw8, the position of the card C in the recording unit 30 can be recognized.

In the recording unit 30, the personal information data are written to the card C while moving the card in the feeding direction Df, and the data recorded to the card are retrieved from the card C to verify the data while moving the card in the backward direction opposite to the direction Df.

Of course, the recorded data may be retrieved from the card C while forwarding the card in the direction Df after returning the card to the initial writing position. However, when an error in writing is found as the result of the verification of the data written to the card, the card should again pass the recording point in the face of the magnetic head 31 in order to overwrite a meaningless erase signal to the card. Accordingly, it may be advantageous to read out the written data from the card to verify the data while moving the card in the backward direction, so that the erase signal can be overwritten to the card while moving the card in the feeding direction Df when the card is regarded to be faulty.

The erase signal to be overwritten to the faulty card may be meaningless binary pulse signals, specific significant binary code signals, direct current signal, alternate current signal or the like.

The operation of writing information data by the recording unit 30 and verifying the written data is controlled by the controller 40.

In addition to the verify circuit 42 for verifying the data retrieved from the card, the controller 40 includes an arithmetic processor 44 for determining the information data signal Si to be written to the card C and evaluating the result of the verification of the data written to the card, and a writing driver 46 for driving the magnetic head 31 in accordance with the information data signal Si.

The verify circuit 42 has a memory (RAM) 42a for temporarily storing the information data Si issued from the processor 44, and a comparator 42b for comparing the written data So retrieved from the card with comparative data -Si derived from the data signal Si originally determined.

The information data Si are generally composed of a series of binary bits representing letters and so on, and stored in the memory 42 in the form of serial binary bit. Therefore, in the case that the information data Si are written to the card moving in the feeding direction Df and retrieved from the card moving backward, the data Si stored in the memory 42 may be read out in the reverse order to determine the comparative data -Si. When the data written to the card are retrieved from the card moving in the feeding direction Df, the data Si may be read out from the memory 42 without reversing the bit order of the data.

The comparative data -Si and the data So read out from the card together are fed to the comparator 42b and compared to verify whether there data agree completely. When the comparative data -Si and the read data So disagree, the card is decided to be faulty.

The card which is regarded as a faulty card when moving backward is reversed to be forwarded in the direction Df while overwriting the erase signal thereto by driving the magnetic head 31.

Both the faulty card and proper card are delivered to the card discharge unit 50. The card discharge unit 50 includes a proper card stacker 51 for collecting the proper card Co, a faulty card stacker 52 for collecting the faulty card Cx, and card distributing means 53 for introducing the proper card Co into the proper card stacker 51 and the faulty card Cx into the faulty card stacker 52.

The card distributing means 53 is formed of nip rollers 53a for holding the card, and a support frame 53b for angularly rotating the nip rollers 53a. By this card distributing means 53, the proper card fed from the recording unit 30 is sent out horizontally to enter into the proper card stacker 51. On the other hand, when the faulty card is fed from the recording unit 30, the card distributing means 53 turns at some degree of angle to incline the card held between the nip rollers 53a, so that the faulty card can be introduced into the faulty card stacker 52.

In the illustrated embodiment, reference numeral 54 denotes a pair of feed rollers, and 55 denotes a stopper plate formed by extending upwardly on one of side walls of the stacker 51 to prevent the card forwarded by the rotating nip rollers 53a from running out horizontally. That is, even when increasing the speed at which the card is fed to speed up the processing, the proper cards can be successfully introduced into the proper card stacker 51.

The card discharge unit 50 including the card distributing means 53 is controlled by the controller 40 in time with the card transferring motion of other elements in this system.

Figure 5:
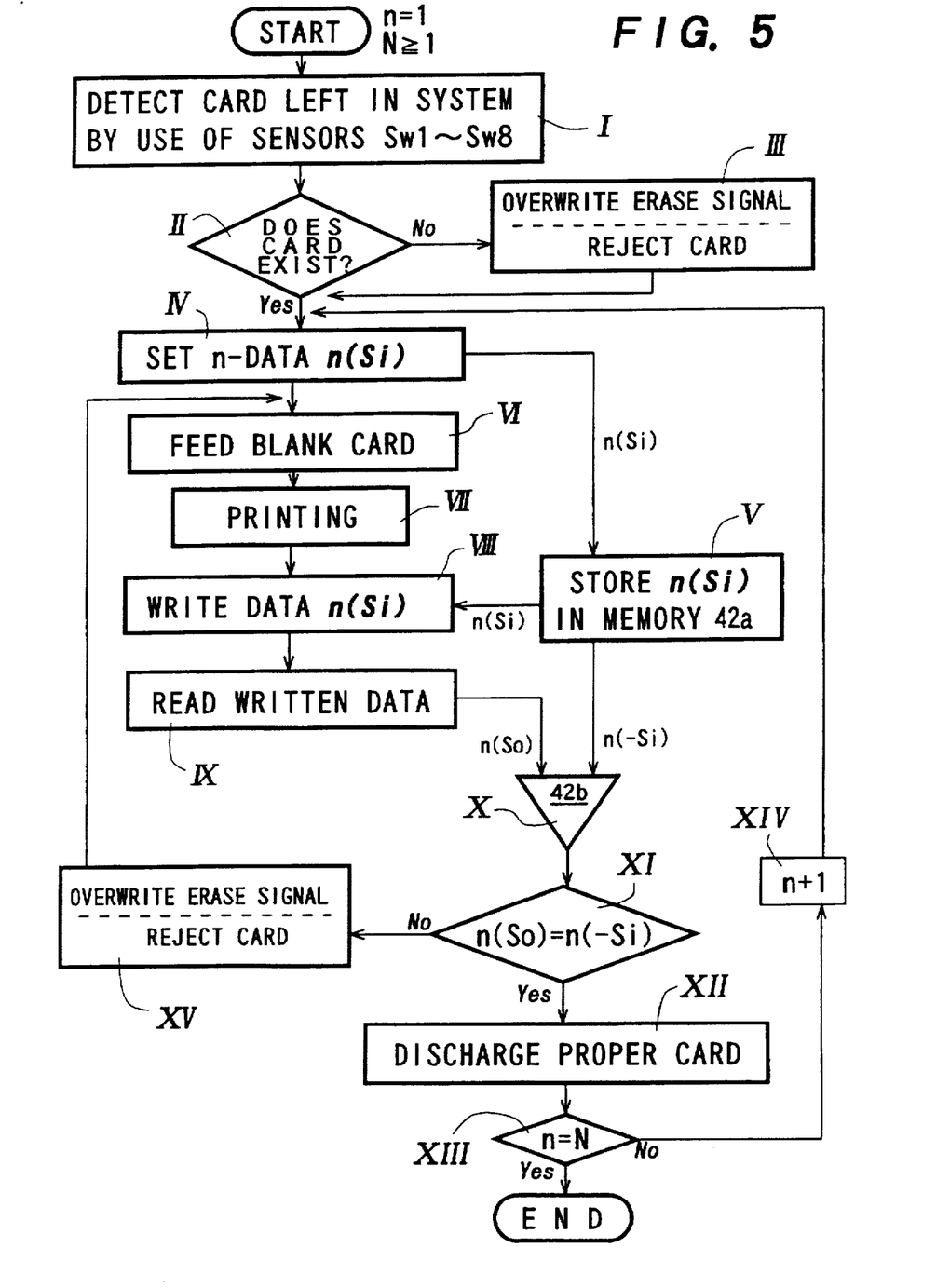
FIG. 5 is a flowchart explanatory of the procedure of processing according to the system of this invention.

Next, the operation of the ID card issuing system as described above will be explained with reference to the flowchart of FIG. 5. It is now assumed that a number N (N≧1) of ID cards to which different personal information data are respectively written are consecutively issued.

First when the electric power is turned ON to be supplied to the system or the system is initialized, a command for issuing the first card (n=1) is given (START). At the commencement of issuing the first card, the card sensors S1 to Sw8 are worked (Step I), so as to verify whether there is left an unfinished card anywhere in the system (Step II).

When the unfinished card exits, the card is deemed to be jammed in the system and rejected into the faulty card stacker 52 by driving the rollers R1, 24a–24c, R2, 32–34 and 58. Before sending out the unfinished card left in the system to the faulty card stacker 52, it is required to pass the unfinished card through the recording unit 30 to overwrite an erase signal as a measure of precaution (Step III).

The preparatory process of Steps II–III is carried out for preventing the unfinished card left in the system due to any possible cause such as power service interruption from passing into another's hands.

When the unfinished card left in the system is rejected in Step III or there is no card left in the system in Step II, n'th information data n(Si) is set (Step IV), and temporarily stored in the memory (RAM) 42a in the verify circuit 42 (Step V).

At the same time, one blank card C is fed from the card feeder 10 to the printing unit 20 through the card passageway W (Step VI). In the printing unit 20, desired printing is performed on the card C (Step VII). The condition of images printed on the card C may be checked in Step VII. If the printing unit 20 misses printing on the card, the card is rejected to the faulty card stokers 52 through the recording unit 30 without being subjected to data writing in the recording unit 30.

In the recording unit 30, the aforesaid information data n(Si) are written to the successfully printed card C by the magnetic head 31 in the printing unit 20 (Step VIII). Then, the data written to the card C are read out from the card C by the magnetic head 31 (Step IX).

Next, the data n(So) read from the card is compared with the comparative data n(-Si) based on the written data n(Si) originally determined and stored in the memory 42a by the comparator 42b (Step X).

As the result of comparison of the two set of data, if the two set of data disagree [n(So)≠n(-Si)], the data writing is considered to be erred and the card is regarded as a faulty card, but when the data agree [n(So)=n(-Si)], the card C is regarded to be proper (Step XI).

The proper card Co is discharged to the proper card stacker 51 (Step XII), and then, the n'th card is verified as to whether it is the last card (Step XIII). When the n'th card is not the last, the same procedure is repeated from Step IV upon renewing the number n by one (n+1) in Step XIV.

As the result of the verification, if it is confirmed that the data writing is erred in Step XI, the erase signal is overwritten to the faulty card and rejected to the faulty card stacker 52 (Step XV). In this case, the same procedure is repeated from Step VI without renewing the number n.

As the aforementioned procedure is repeated N-times, i.e. n=N, the procedure for issuing the desired number of ID cards is completed (END).

Incidentally, the erase signal which is overwritten to the faulty card Cx in Step III or Step XI may be again retrieved from the faulty card, so that the written erase signal and the retrieved erase signal are compared with each other to verify whether or not the erase signal is surely written to the faulty card, or whether a meaningful vestige of the written information data are left in the card. If any meaningful marks are left in the card, the erase signal is again overwritten to the card.

As is apparent from the above description, the ID card issuing system according to this invention can absolute secrecy of personal information data including a secret personal ID code and the like to be recorded on the ID card.

In the foregoing embodiment, the printing unit 20 is made up of one set of thermal ink ribbon 21 and thermal head 22 for printing on the card. However, as illustrated in FIG. 6, the ID card issuing system may be provided with two printing units formed of two sets of thermal ink ribbons 121a and 121b and thermal heads 122a and 122b for performing multiple printings on the card.

That is, between the card feeder 10 and the recording unit 30 along the card passageway W, there are arranged the first printing unit 120A having the ink ribbon 121a and thermal head 122a, and the second printing unit 120B having the ink ribbon 121b and thermal head 122b. For instance, the ink ribbon 121a may be applied with dye-sublimation color inks for printing a full color photograph and so on, and the ink ribbon 121b may be of monochromatic thermally fusible wax-transfer ink (e.g. black ink) for printing two gradation images such as letters, marks and bar-code patterns.

Figure 6:
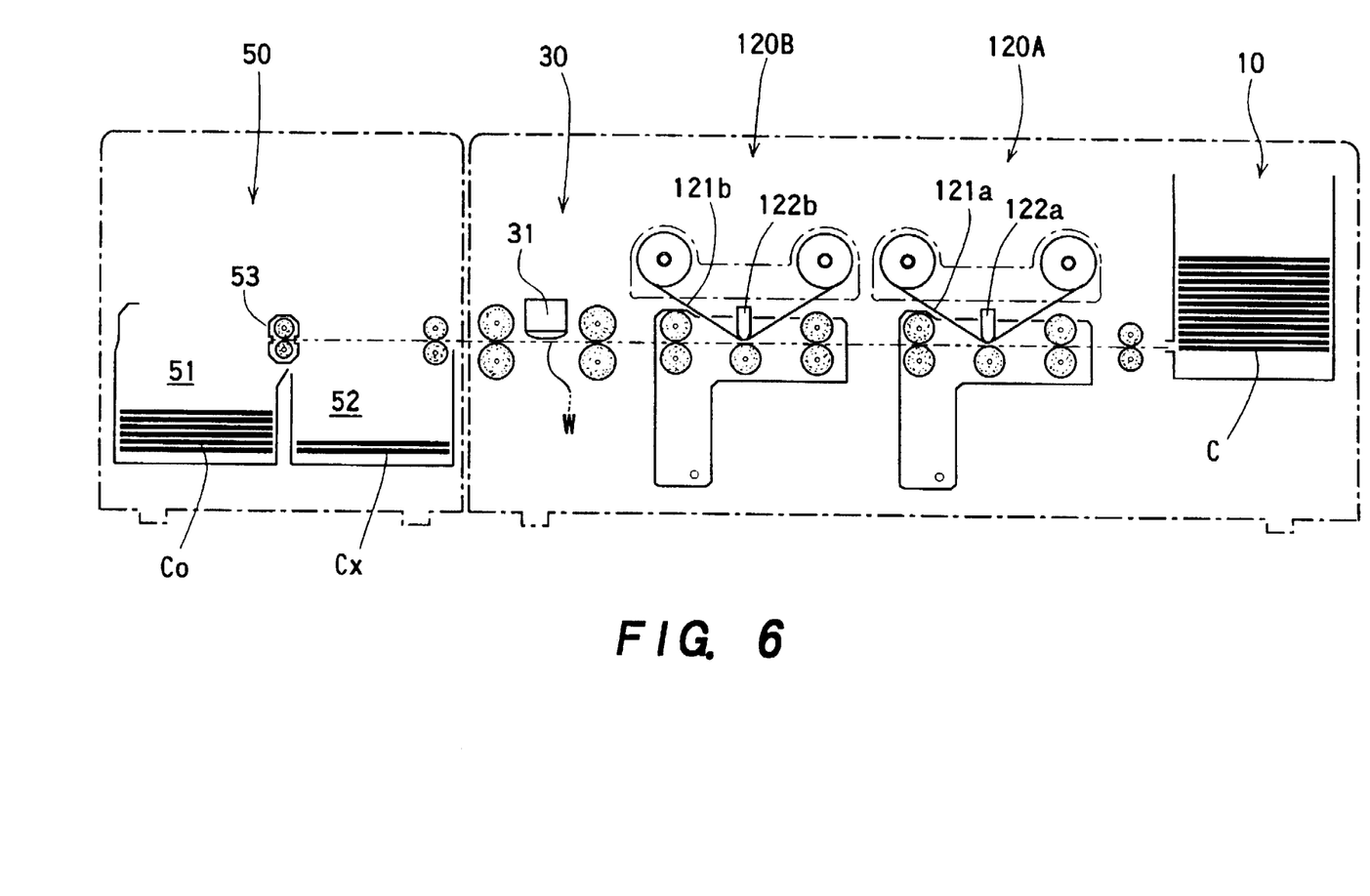
FIG. 6 is a front view schematically showing a second embodiment of this invention.

The system shown in FIG. 6 can fulfill multiple color printing on the card. In this illustrated embodiment, the elements depicted by like reference numeral with respect to those of the first embodiment have analogous structures and functions to those of the first embodiment and will not be described in detail again.

Figure 7:
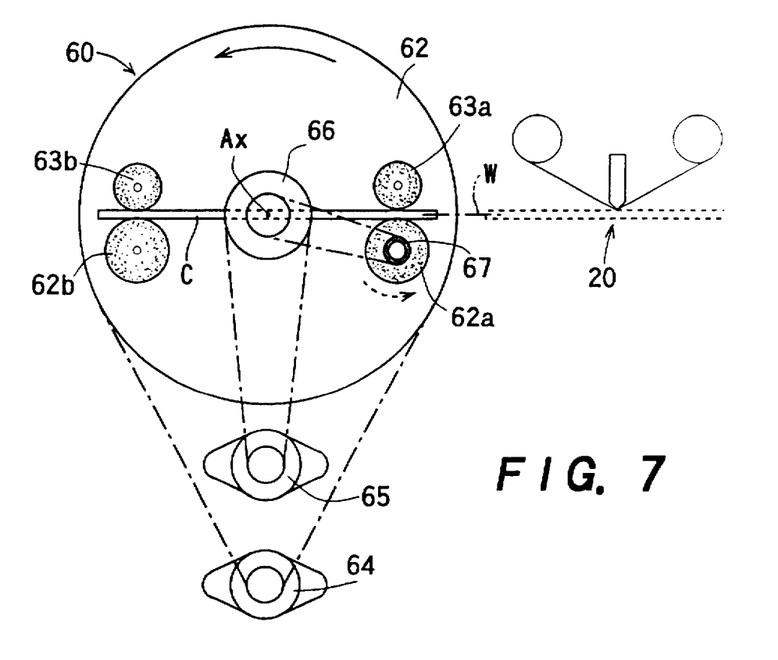
FIG. 7 is a front view schematically showing a card turning unit for performing both-side printing in a third embodiment of this invention.

Although the second embodiment of FIG. 6 can print desired patterns and/or images of every kind on one side of the card C, it is possible to perform both-side printing by disposing a card turning unit 60 behind the printing unit 20 as shown in FIG. 7.

The card turning unit 60 in the third embodiment of FIG. 7 functions to reverse the card C 180 degrees and send back the reversed card to the printing unit 20. According to this embodiment, the desired images can be printed on the both sides of the card C with only one printing unit capable of performing printing on one side of the card.

The card turning unit 60 comprises a rotary frame 62 having two sets of transfer rollers 62a and 62b and pinch rollers 63a and 63b coming into press contact with the rollers 62a and 62b so as to hold the card C therebetween.

The rotary frame 62 is rotated around an axis Ax by driving means including a motor 64 in one direction (counterclockwise in this embodiment).

At least one of transfer rollers 62a and 62b (roller 62a in the illustrated embodiment) is rotated in the same direction as that the rotary frame 62 is rotated (counterclockwise in this embodiment) by driving means including a motor 65 through a pulley 66 pivoted on the axis Ax. By rotating the rollers 62a and 62b, the card C held by the rollers 62a–63a and 62b–63b is moved along the card passageway W.

At one time, either the rotary frame 62 or the transfer rollers 62a and 62b are rotated. Therefore, a one-way clutch 67 may be incorporated in at least one of rollers 62a and 62b, so that, when rotating the rotary frame 62, the rollers 62a and 62b do not rotate. Thus, the card C held between the paired rollers 62a–63a and 62b–63b as illustrated is not moved in the lengthwise direction even when the rotary frame 62 rotates 180 degrees, because the rollers 62a and 62b do not rotate when rotating the rotary frame 62 counterclockwise.

Accordingly, the card C is neither displaced nor out of place even when the rotary frame 62 rotates.

Although the illustrated embodiment is formed by applying the card turning unit 60 to the first embodiment, it may of course be applied to the second embodiment of FIG. 6.

The controller 40 as specified above may be incorporated in either the system of this invention or an external controlling system such as a personal computer. The card feeder 10, printing unit 20 or printing units 120A and 120B, recording unit 30 may be integrated into one body, or separated from one another so as to be united in use.

Figure 8:
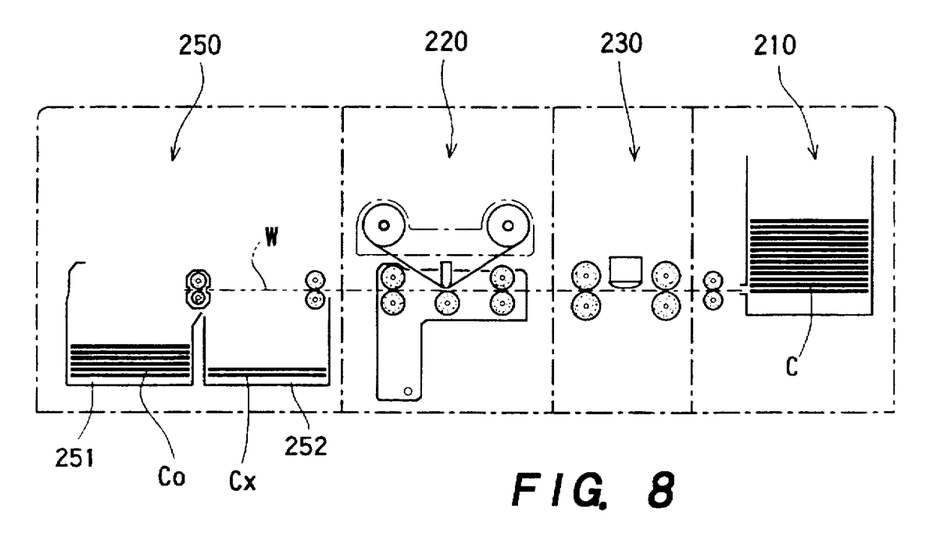
FIG. 8 is a schematic diagram of a fourth embodiment of this invention.

Furthermore, although the recording unit 30 is located behind the printing unit 20 in the foregoing embodiments, this arrangement is reversible. That is to say, the recording unit may be located before the printing unit as schematically shown in FIG. 8.

To be more specific, a card feeder 210, recording unit 230, printing unit 220, and card discharge unit 250 are juxtaposed in order along the card passageway W.

Figure 9:
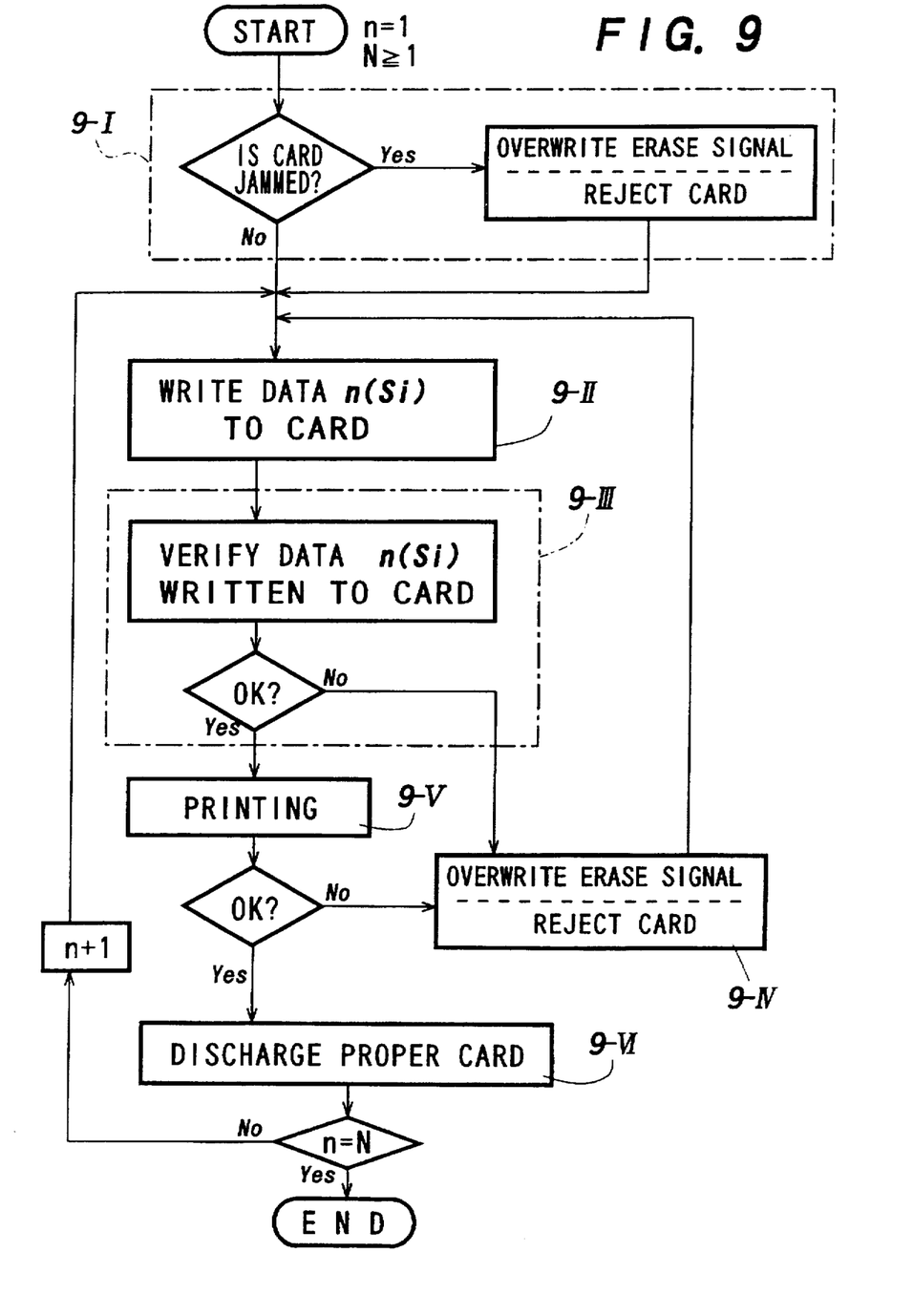
FIG. 9 is a flowchart explanatory of the procedure of processing of system shown in FIG. 8.

The operation of this system will be described hereinbelow with reference to the flowchart of FIG. 9.

First, the system is powered on or initialized, and an initial value n=1 is set (START). Then, a jam check is performed in Step 9-I in the same manner as Steps I to III in the first embodiment as depicted in FIG. 5.

Thereafter, one blank card is fed to the recording unit 230, so that desired information data n(Si) are written to the card (Step 9-II). Then, in Step 9-III, the verification is carried out in the same manner as Steps VI to IX In FIG. 5.

As the result of the verification, when the data writing is erred, the card is regarded as a faulty card to which an erase signal should be overwritten and rejected to the faulty card stacker 252 (Step 9-IV). Otherwise, when the data writing is regarded to be proper, the card C is forwarded to the printing unit 220 so that desired images are printed thereon (Step 9-V). The proper card C thus printed is sent to the proper card stacker 251.

When the procedure of issuing of n'th card is completed, the number n is renewed by one (n+1), so that the next (n+1'th) card is processed. Thus, the same procedure is repeated from Step 9-II.

As is apparent from the foregoing description, according to the present invention, when an error occurs in processing an ID card, the card is regarded as a faulty card and rejected upon deleting information data recorded on the card, so that absolute secrecy of personal information can be ensured. The ID card issuing system of the present invention is applicable to any type of ID cards to which the information data are written not only magnetically but also electrically, electronically, or optically, or by any other measures. That is, the information data are written to a card having a magnetic strip and/or hologram, IC card and the like, and deleted when they are unsuccessfully written.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An ID card issuing system, comprising:
   a printing unit for printing images on at least one side of a card;
   recording unit for writing information data to said card and retrieving the written information data from said card;
   a controller having a verify circuit for verifying the information data retrieved from said card as to whether said information are successfully written to said card and regarding the card as a faulty card when said information data are unsuccessfully written to said card;
   a card discharge unit including a proper card stacker and a faulty card stacker to which said faulty card is discharged, said printing unit, record unit, proper card stacker and faulty card stacker being arranged along a card passageway, said proper card stacker and said faulty card stacker being adjacent to each other;
   means for erasing the information data written to said card by overwriting an erase signal to said card when said card is regarded to be faulty; and
   means for rejecting said card when said card is regarded to be faulty in said verify circuit.

2. An ID card issuing system according to claim 1, wherein said information data are magnetically written to said card.

3. An ID card issuing system, comprising:
   a printing unit for printing images on at least one side of a card;
   a recording unit for writing information data to said card and retrieving the written information data from said card;
   a controller having a verify circuit including a memory for storing the information data to be written to said card as a comparative signal;
   a comparator for comparing said information data stored in said memory and said written information data retrieved from said card, said verify circuit verifying the information data retrieved from said card on the basis of said comparative signal as to whether said information data are successfully written to said card and regard the card as a faulty card when said information data are unsuccessfully written to said card;
   a card discharge unit having a faulty card stacker;
   means for erasing the information data written to said card by overwriting an erase signal to said card when said card is regarded to be faulty; and
   means for rejecting said card to said faulty card stacker when said card is regarded to be faulty.

4. An ID card issuing system, comprising:
   a card feeder for accommodating one or more cards and feeding said cards one by one;
   a printing unit for printing images on at least one side of said card fed from said card feeder;
   a recording unit for writing information data to said card and retrieving the written information data from said card;
   a controller having a verify circuit including a memory for storing the information data to be written to said card as a comparative signal;
   a comparator for comparing said information data stored in said memory and said written information data retrieved from said card, said verify circuit verifying the information data retrieved from said card on the basis of said comparative signal as to whether said information data are successfully written to said card and regarding the card as a proper card when said information data are successfully written or the card as a faulty card when said information data are unsuccessfully written to said card;
   a card discharge unit having a proper card stacker, a faulty card stacker and card distributing means for introducing said proper card into said proper card stacker and said faulty card into said faulty card stacker;
   means for erasing the information data written to said faulty card by overwriting an erase signal to said faulty card; and
   means for rejecting said faulty card to said faulty card stacker.

5. An ID card issuing system according to claim 4, wherein said printing unit includes at least one thermal transfer ink ribbon applied with one or more kinds of thermal transfer inks and at least one thermal head for selectively thermal-transferring said inks to said card to produce images on said card.

6. An ID card issuing system according to claim 4, wherein said recording unit is disposed behind said printing unit along a card passageway.

7. An ID card issuing system according to claim 4, wherein said recording unit is disposed before said printing unit along a card passageway.

8. An ID card issuing system according to claim 4, further comprising a card turning unit for reversing said card sent out from said printing unit and returning the reversed card to said printing unit, so as to print images on both sides of said card.

9. An ID card issuing system, comprising:

a card feeder for accommodating one or more cards and feeding said cards one by one;

a printing unit for printing images on at least one side of said card fed from said card feeder;

a recording unit for writing information data to said card and retrieving the written information data from said card;

a controller having a verify circuit including a memory for storing the information to be written to said card as a comparative signal;

a comparator for comparing said information data stored in said memory and said written information data retrieved from said card, said verify circuit verifying the information data retrieved from said card on the basis of said comparative signal as to whether said information data are successfully written to said card and regarding the card as a proper card when said information data are successfully written or the card as a faulty card when said information data are unsuccessfully written to said card;

a card discharge unit having a proper card stacker, a faulty card stacker and card distribution means for introducing said proper card into said proper card stacker and said faulty card into said faulty card stacker;

means for erasing said information data written to said faulty card by overwriting an erase signal to said faulty card; and means for rejecting said faulty card to said faulty card stacker;

wherein said printing unit includes two thermal transfer ink ribbons, one of said ink ribbons being applied with monochromatic thermally fusible wax-transfer ink, and the other ink ribbon being applied with multiple colors of dye-sublimation inks, and two thermal heads for thermally transferring said inks on said ink ribbons, respectively.

10. A method for issuing ID cards in an ID card issuing system having a printing unit for printing images on at least one side of the card, and a recording unit for writing information data to said card, which comprises:

determining information data to be written to said card, writing said information data to said card, retrieving said written information data from said card, verifying whether said information data is successfully written to said card to verify said written information data on the basis of said information data originally determined, regarding the card as a faulty card when said information data are unsuccessfully written to said card as a result of verification, overwriting an erase signal to said faulty card, and rejecting said faulty card.

11. A method according to claim 10, wherein said erase signal is a meaningless signal.

12. A method according to claim 10, wherein said erase signal is formed of significant binary codes, and said erase signal overwritten to said faulty card is retrieved from said faulty card and verified, and wherein said method further comprises the step of writing said erase signal to said faulty card again when said erase signal is unsuccessfully written to said faulty card as a result of verification of the erase signal overwritten to said faulty card.

13. A method according to claim 10, wherein said information data are magnetically written to said card, and said erase signal is magnetically overwritten to said faulty card.

14. A method for issuing ID cards comprising:

printing images on at least one side of the card, determining information data to be written to said card, writing said information data to said card, retrieving said written information data from said card, verifying whether said information data is successfully written to said card to verify said written information data on the basis of said information data originally determined, regarding the card as a proper card when said information data are successfully written to said card as a result of verification, introducing said proper card to a proper card stacker, regarding the card as a faulty card when said information data are unsuccessfully written to said card as a result of verification, overwriting an erase signal to said faulty card, and rejecting said faulty card to a faulty card stacker.

15. A method for issuing ID cards comprising:

determining information data to be written to said card, writing said information data to said card, retrieving said written information data from said card, verifying whether said information data is successfully written to said card to verify said written information data on the basis of said information data originally determined, regarding the card as a proper card when said information data are successfully written to said card as a result of verification, regarding the card as a faulty card when said information data are unsuccessfully written to said card as a result of verification, overwriting an erase signal to said faulty card, printing images on at least one side of said card, introducing said proper card to a proper card stacker, and rejecting said faulty card to a faulty card stacker.

16. An ID card issuing system, comprising:

a card passageway along which a card is transported;

a printing unit for printing images on at least one side of the card;

a recording unit for writing information data to said card and retrieving the written information data from said card;

at least one sensor for detecting jamming of the card being transported along said card passageway;

a controller having a verify circuit including a memory for storing the information data to be written to said card as a comparative signal;

a comparator for comparing said information data stored in said memory and said written information data retrieved from said card, said verify circuit verifying the information data retrieved from said card on the basis of said comparative signal as to whether said information data are successfully written to said card and regard the card as a faulty card when said information data are unsuccessfully written to said card;

a card discharge unit having a faulty card stacker;

means for erasing the information data written to said card by overwriting an erase signal to said card when said card is regarded to be faulty or the card causing jamming in said card passageway is detected by said sensor;

means for rejecting said card to said faulty card stacker when said card is regarded to be faulty or the card causing jamming in said card passageway is detected by said sensor.

* * * * *